US007034283B2

(12) United States Patent
Williams et al.

(10) Patent No.: US 7,034,283 B2
(45) Date of Patent: Apr. 25, 2006

(54) ABSOLUTE INCREMENTAL POSITION ENCODER AND METHOD

(75) Inventors: Darin Williams, Tucson, AZ (US); Walter Wrigglesworth, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 208 days.

(21) Appl. No.: 10/382,225

(22) Filed: Mar. 5, 2003

(65) Prior Publication Data

US 2004/0173735 A1 Sep. 9, 2004

(51) Int. Cl.
*G01D 5/34* (2006.01)

(52) U.S. Cl. .......................... 250/231.16; 250/231.18; 356/617; 341/13

(58) Field of Classification Search ........... 250/231.13, 250/231.14, 231.16, 231.18; 356/614, 616, 356/617; 341/9, 11, 13, 15; 33/707
See application file for complete search history.

(56) References Cited

U.S. PATENT DOCUMENTS 5,436,640 A * 7/1995 Reeves ....................... 345/161
5,898,421 A 4/1999 Quinn
6,327,791 B1 12/2001 Norcross et al.
6,452,158 B1 * 9/2002 Whatley et al. ....... 250/231.13
6,459,389 B1 10/2002 Germuth-Loffler
6,512,589 B1 * 1/2003 Rodi ......................... 356/617

FOREIGN PATENT DOCUMENTS

DE 44 36 784 A1 4/1995
DE 198 133 803 C1 5/2000
JP 08043133 2/1996
JP 1996043133 A 2/1996

* cited by examiner

*Primary Examiner*—Kevin Pyo
(74) *Attorney, Agent, or Firm*—Thomas J. Finn; Leonard A. Alkov; Karl A. Vick

(57) ABSTRACT

A position encoder uses a track encoded with a pattern of bit-widths in accordance with a sequence. The sequence may be any sequence having unique subsequences, and may be a pseudo-random noise (PRN) sequence such that each N-bit subsequence occurs only once on the track. Sensors detect transitions between the bits and bit-widths as the track moves with respect to the sensors to provide in-phase and quadrature-phase pick-off signals. The pickoff signals are summed and absolute value thresholded. The absolute value thresholded sum signal is sampled when the quadrature pairs are in the "00" or "11" quadrants, and latched when the sum signal goes high to distinguish between wide and narrow bit widths. The latch is shifted into a shift data register for use in determining the position of the encoder track. In the case of a PRN sequence having a length of $2^N$ bits, the position may be an absolute position when the number of valid bits in the shift data register is at least N. The position may be an incremental position when the number of transitions detected is less than N.

20 Claims, 7 Drawing Sheets

ABSOLUTE INCREMENTAL POSITION ENCODER AND METHOD

TECHNICAL FIELD

The present invention pertains to position encoders and methods for determining position, and in one embodiment, to optical position encoders.

BACKGROUND

Position encoders are used to accurately determine a position difference between elements of a device or system. Conventional position encoders are either incremental position encoders or absolute position encoders, but not both. An incremental position encoder provides position information indicating the change from a prior position, while an absolute position encoder provides absolute position information indicating a specific position regardless of prior position. Position encoders are used in automated manufacturing, gimbaled systems, and elsewhere when accurate positional information is desired. In gimbaled-camera systems, for example, absolute position encoders may be used for accurate line-of-sight reconstruction in guidance.

Some conventional position encoders use separate encoder tracks for each bit of a Grey code, in which only one bit of the code changes at a time. Detectors are used to detect which bit changes to determine a position. One problem with this arrangement is that higher resolution requires a high number of separate encoder tracks. Another problem is that this arrangement is highly sensitive to contamination, which results in erroneous position information.

Thus, there is a general need for an improved position encoder and method for determining position of an encoder track. There is also a need for a position encoder and method where the unambiguous range may be increased almost without limit. There is also a need for a position encoder and method where the unambiguous range may be increased without degrading absolute accuracy. There is also a need for a position encoder and method with an increased unambiguous range without a significant increase in size or complexity. There is also a need for an optical position encoder and method that is less sensitive to contamination. There is also a need for a gimbaled system with improved line-of-sight tracking having at least some of the preceding benefits.

SUMMARY

A position encoder detects bit-width transitions from a sequence having a plurality of unique subsequences. In embodiments, the position encoder may use a single track encoded with a pattern of bit-widths in accordance with the sequence. The sequence may be a pseudo-random noise (PRN) sequence or other sequence having unique subsequences. In one embodiment, sensors detect transitions between the bit-widths as the track moves to provide in-phase and quadrature-phase pick-off signals. When a PRN sequence is used having a length of $2^N$ bits, the position of the track may be an absolute position when the number of transitions between the bit-widths detected by the sensors is at least N. The position may be an incremental position when the number of transitions between bit-widths detected by the sensors is less than N.

In one embodiment, each bit-width encoded on the track has either a first width or a second width determined by the sequence. The first width may represent the "ones" in the sequence and the second width may represent the "zeroes" in the sequence. The pattern on the track may be a pattern of alternating dark and light portions having the bit-widths encoded in accordance with bits of the sequence, and the first-and second sensors may be optical sensors positioned to have overlapping fields of view.

In yet other embodiments of the present invention, a gimbaled system is provided, which may be suitable for use in line-of-sight tracking. The system may include two or more nested gimbals with associated position encoders to provide incremental and/or absolute positional information for the associated gimbal.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the claims and all equivalents.

Figure 1:
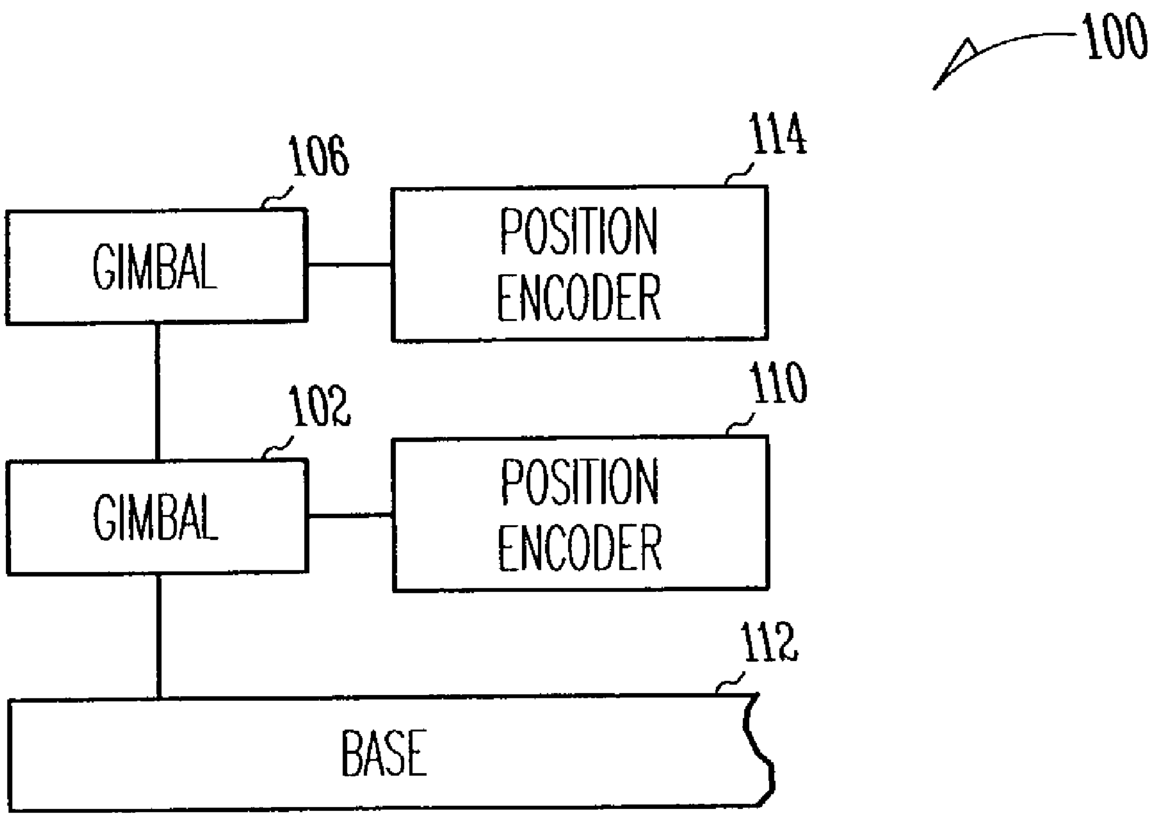
FIG. 1 is a diagram illustrating a gimbaled system in accordance with an embodiment of the present invention.

The present invention provides, among other things, an improved position encoder and method for determining position. FIG. 1 is a diagram illustrating a gimbaled system in accordance with an embodiment of the present invention. Gimbaled system 100 may include one or more gimbals 102 and 106. In the embodiment illustrated, inner gimbal 106 may be nested within outer gimbal 102 allowing inner gimbal 106 to rotate within outer gimbal 102. Gimbaled system 100 may also include position encoder 110 to determine an angular position of gimbal 102 with respect to base 112, and position encoder 114 to determine an angular position of gimbal 106 with respect to gimbal 102. The position encoders may have tracks encoded with a pattern of bit-widths in accordance with a sequence. The sequence may be comprised of a plurality of unique subsequences, and in one embodiment, may be a pseudo-random noise (PRN) sequence. Position encoders 110 and 114 may detect transitions between the bit-widths as their corresponding track moves to provide pick-off signals for use in determining positions of the tracks. In the embodiment that uses a PRN sequence having a length of $2^N$ bits, the position of a track may be an absolute position when a number of transitions detected at least N. The position of a track may be an incremental position when the number of transitions detected is less than N. The operation of suitable position encoders is described in more detail below.

In some embodiments, system 100 may be suitable for use in tactical airborne systems including guided projectiles, missiles and aircraft, and may be used for line-of-sight tracking and/or targeting. In some embodiments, position encoders 110 and 114 may provide position information used for tracking images by an airborne system in which a stored image may be compared with a current image seen by the system. Although the embodiments described herein describe the encoder tracks as part of position encoders 110 and 114, this is not a requirement. In other embodiments, the encoder tracks may be part of other system elements.

In one embodiment, gimbaled system 100 may provide for image tracking using a control system reference frame position to command a line-of-site vector provided by a gimbal to desired coordinates. A mission computer on an airborne platform may compute the desired coordinates. In one embodiment, when tracking an image in space, the position encoders may be used to transform the position of an image from gimbal-mounted camera into seeker-based coordinates.

Figure 2:
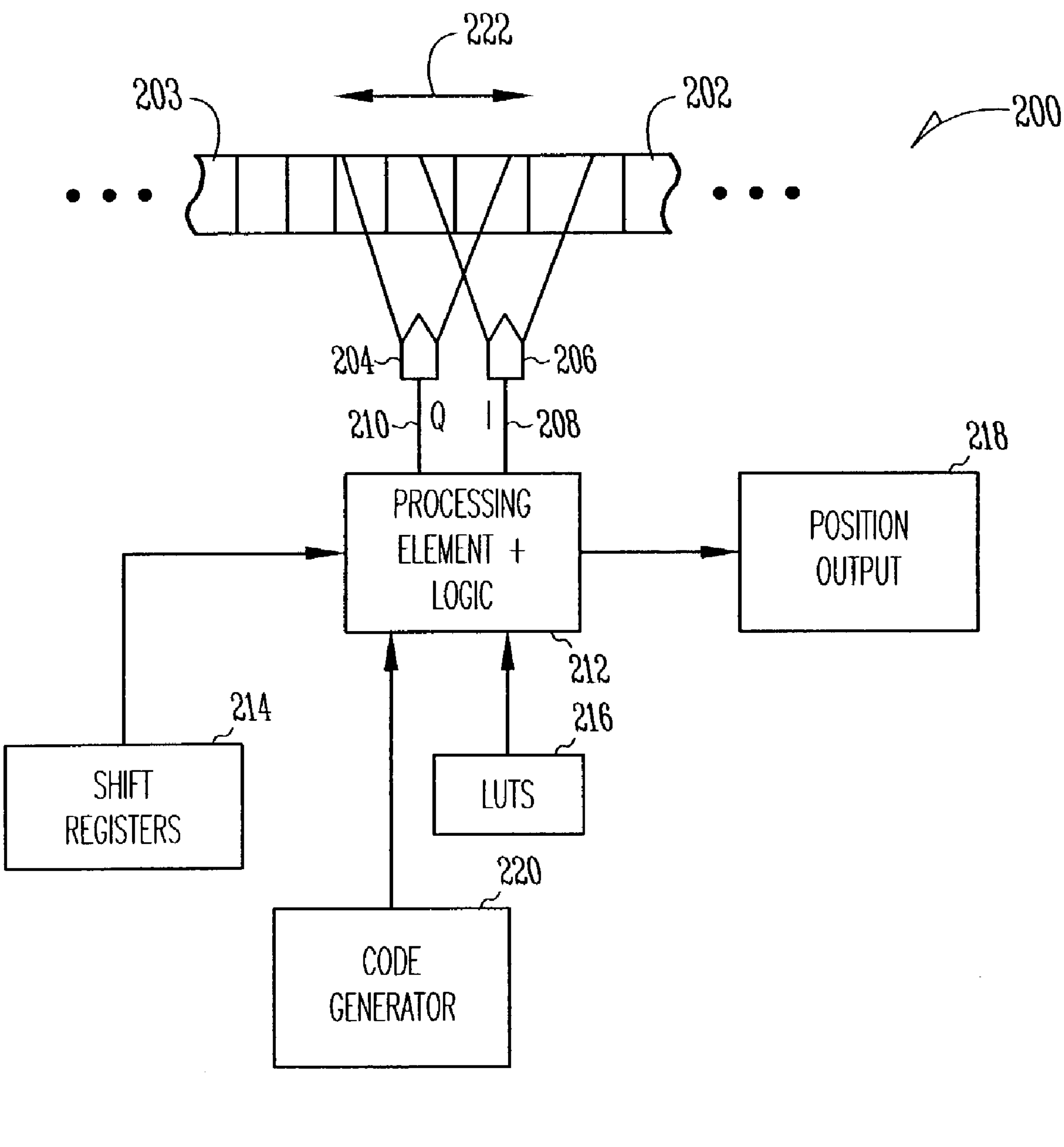
FIG. 2 is a block diagram of a position encoder in accordance with an embodiment of the present invention.

FIG. 2 is a block diagram of a position encoder in accordance with an embodiment of the present invention. Position encoder 200 may be suitable for use as one or both of position encoders 110 and 114 (FIG. 2) although other position encoders may also be suitable. Position encoder 200 may also be suitable for use in detecting relative positions of elements in automated equipment (e.g., robotic arms, etc.). Position encoder 200 may be used to provide an absolute and/or incremental position of an encoded track and may be used in almost any system where positional information is desired. In some embodiments, position encoder 200 uses a single encoder track, such as track 202, encoded with a pattern of bit-widths 203 in accordance with a sequence. The sequence may comprise a plurality of unique subsequences, and in some embodiments, may be a pseudo-random noise (PRN) sequence. Sensors 204 and 206 detect transitions between bit-widths 203 as encoder track 202 moves with respect to the sensors to provide pick-off signals 208 and 210. In one embodiment, sensors 206 and 204 provide in-phase and quadrature-phase pick-off signals, respectively. A relative or absolute position of track 202 may be determined from the pick-off signals.

In one embodiment, processing element 212 generates quadrature pairs from pick-off signals 208, 210 and may shift either a one or zero bit into shift registers 214 for certain transitions depending on the quadrature pair. This is described in more detail below. The bits in the shift registers may correspond with one of the unique subsequences, which may be encoded on track 202. In one embodiment, the subsequence corresponding with the bits in shift registers 214 may be looked up in a table, such as look-up-table (LUT) 216. In this embodiment, LUT 216 may store the unique subsequences that comprise the sequence encoded on the track. In one embodiment, left and right LUTs may be used depending on direction 222 of motion of track 202. Processing element 212 generates position output 218 determined from the LUT(s).

In another embodiment code generator 220 may be used instead of table 216. In this embodiment, code generator 220 may, in real-time, generate a sequence corresponding with the sequence encoded on track 202. Processing element 212 may identify a match between the subsequence from the bits in the shift register 214 with subsequences of the sequence being generated by generator 220 by searching through the code to determine a position of the track. In one embodiment, the code generator may generate a code in either a forward or reverse direction depending on direction 222 of the motion of track 202. In this embodiment, processing element 218 generates position output 218 by comparing the matched subsequence with a known location on track 202.

Position output may be an incremental position when the number of bits shifted into one of shift registers 214 is less than N, and position output 218 may be an absolute position when the number of bits shifted into one of shift registers 214 is at least N. An incremental position refers to the change in position from a prior position.

In one embodiment (e.g., part of a gimbaled system), track 202 may be circular, and the size of bit-widths 202 and the length of the sequence may be selected so that any N-bit subsequence in the pattern occurs only once on track 202. N, for example, may range between three and twenty-four, or even greater. N may be based on the binary log of a dynamic range of the encoder and/or the desired accuracy of the positional information provided by the encoder.

Although encoder 200 is illustrated as having several separate functional elements, one or more of the functional elements may be combined and may be implemented by combinations of software configured elements, such as processors including digital signal processors (DSPs), and/or other hardware elements. For example, processing element 212 and code generator 220 may be implemented with software and/or hardware logic.

Figure 3:
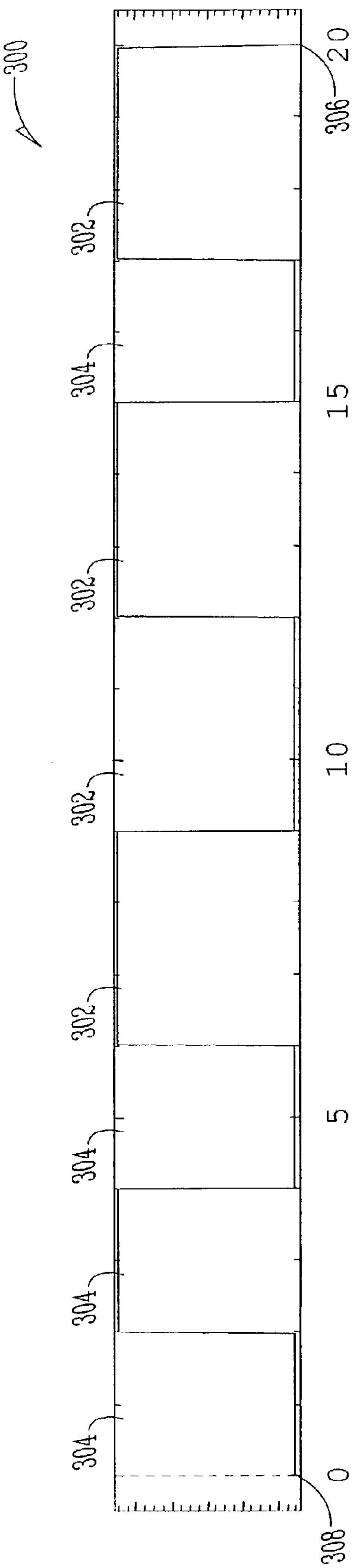
FIG. 3 illustrates a pattern of an encoder track accordance with an embodiment of the present invention.

FIG. 3 illustrates a pattern of an encoder track accordance with an embodiment of the present invention. Track 300 may be suitable for use as track 202 (FIG. 2) of encoder 200 (FIG. 2). Track 300 is encoded with a pattern of bit-widths in accordance with a sequence having a plurality of unique subsequences. In one embodiment, each bit-width encoded on the track 300 may be either narrow width 304 or wide width 302 based on the sequence. Bits encoded on track 300 of width 304, for example, may represent the "ones" in the sequence and bits encoded on track 300 of width 302 may represent the "zeroes" in the sequence. In this example, track 300 is illustrated as having a $2^3$ bit sequence (i.e., having a length of eight bits) represented as "0, 0, 0, 1, 1, 1, 0, 1", which is encoded thereon. The "ones" or the "zeros" of a sequence may be assigned to either the wide or narrow widths. In some embodiments, at end position 306, the encoder may wrap back to zero position 308. For illustrative purposes, width 302 representing "ones" is shown as having a width of three-units, and width 304 representing the "zeroes" is shown as having a width of two-units, however the actual size and ratio of wide and narrow widths may vary depending on system requirements and the dynamic range of the sensors.

The number "N" may be selected to provide a desired dynamic range for the encoder and for other system requirements. In the examples discussed herein, N is selected to be 3. In one embodiment, a sequence, such as a PRN sequence, of length $2^N$ may be selected so that every possible subsequence occurs once, including wrapping back through a staring position of the track (e.g. for circular tracks). The reverse of the sequence also has this property allowing for position determination in both directions. Since the pattern repeats every $2^N$ bits, the pattern may be equivalent to a circular encoder, which wraps around at the point of repetition.

The suitable sequence encoded on track 202 may be generated using one of many conventional techniques, including convention PRN sequence generation techniques. For example, a polynomial generator may be used with feedback shift registers to generate a sequence having a plurality of unique subsequences. Conventional sequence generators may produce all subsequences, except possibly a subsequence containing all zeros, however this subsequence may be added to the track by inserting a zero into the subsequence of N-1 zeroes, which does occur. Alternatively, a suitable sequence may be generated by a trial and error tree descent process in which each possible value for a next bit is checked. The sequence is backed up when subsequences are produced which have already occurred. The N-1 subsequences may wrap back to the start (e.g., on a circular track) may also be checked. This conventional trial and error sequence generation technique may be used to generate sequences of up to sixteen bits or even greater depending on the processing power available.

Figure 4:
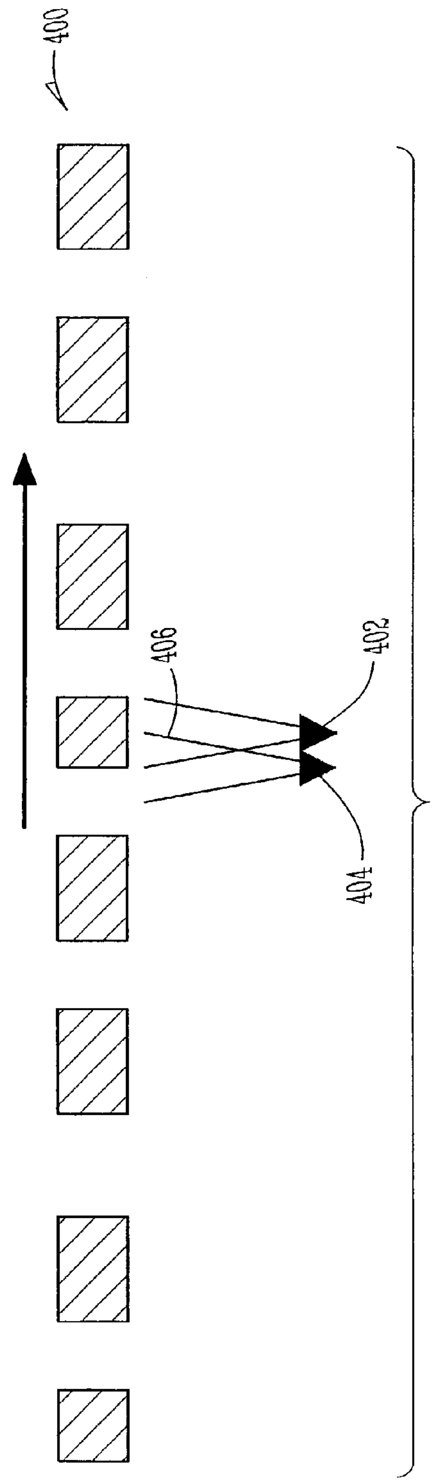
FIG. 4 illustrates an alternating light and dark pattern of an encoder track in accordance with an embodiment of the present invention.

FIG. 4 illustrates an alternating light and dark pattern on an encoder track in accordance with an embodiment of the present invention. Example pattern 400 may be suitable for use on track 202 (FIG. 2). Pattern 400 may be a pattern of alternating dark and light portions having the bit-widths encoded in accordance bits of a sequence. The dark and light portions may be colored portions including, for example, black and white colored portions, darker and lighter grey colored portions, or other colored portions. In embodiments, two, three or four colors or more may be used. The sequence may repeat circularly for a circular encoder track (e.g., once every 360 degrees). In example track 300 (FIG. 3), the bit widths may alternate between light and dark. In the embodiment illustrated in FIG. 4, sensors 402 and 404 may correspond with sensors 204 and 206 (FIG. 2), respectively, may be optical pick-offs positioned to have overlapping fields of view 406. In this embodiment, the narrow and wide widths of the bit-widths on the track may be based on the fields of view of the sensors. In one embodiment, a displacement between in-phase sensor 402 and quadrature-phase sensor 404 may be about one-half the narrower bit-width, which is equal to one of the arbitrary units illustrated on track 300 (FIG. 3). As a result of the displacement between sensors 402 and 404, the sensors detect bit transitions at different times as pattern 400 moves past the sensors. In this embodiment, the pickoff signals may be provided to a processing element for integration over +/− one unit of angle. This is discussed further below.

In an analog embodiment, a narrow width may be set based on a point-spread-function (PSF) of an optical pickup used for one of sensors 204 or 206 (FIG. 2) so that the output from the pickoff peaks at a point at the middle of each narrow width bit. In this embodiment, the PSF of the pickoff may be assumed to be rectangular and integrated over +/− one unit of angle The embodiment of alternating light and dark widths illustrated in FIG. 4 is suitable for use with optical pickoffs for an optical pickoff embodiment; however other embodiments may use other means of encoding a track and detecting bit-width transitions. For example, in another embodiment, a moving element, such as a track, may be encoded with a magnetic or electric fields and electric or magnetic pickups may be used to detect transitions.

Figure 5:
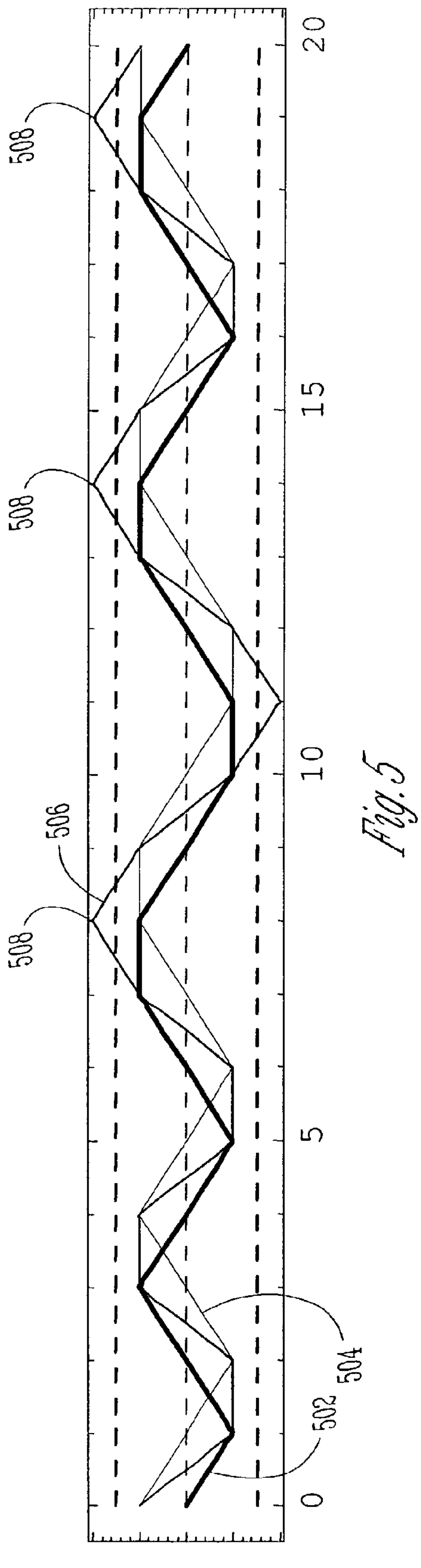
FIG. 5 illustrates in-phase and quadrature phase sensor outputs in accordance with an embodiment of the present invention.

FIG. 5 illustrates in-phase and quadrature phase sensor outputs in accordance with an embodiment of the present invention. Signal 502 illustrates the output (e.g., a pick-off signal) of an in-phase sensor, such as sensor 402 (FIG. 4) and signal 504 illustrates the output (e.g., a pick-off-signal) of a quadrature-phase sensor, such as sensor 404 (FIG. 4). These signals may correspond with the detection of bit-width transitions illustrated on track 300 (FIG. 3). The sum of signals 502 and 504 is illustrated as sum signal 506. In one embodiment, a width of wide width 302 (FIG. 3) may be selected so that the absolute value of sum signal 506 exceeds the absolute value of either signal 502, 504 in approximately the middle of wide bits (e.g., at peaks 508), but not elsewhere. The width of wide width 302 (FIG. 3) may also be selected so that sum signal 506 does not always peak before approximately the middle of a wide bit-width. This selection of the width of the bit widths may include the consideration of tolerances.

In one embodiment, a processing element, such as processing element 212 (FIG. 2), may threshold these signals to generate threshold signals. For example, signals 502 and 504 may be zero-thresholded while sum signal 506 may be absolute value thresholded. The sum threshold may be set to provide the greatest separation between peaks of signals 502, 504 and peaks 508 of sum signal 506 as illustrated in FIG. 5. This thresholding may be used to produce quantized results.

Figure 6:
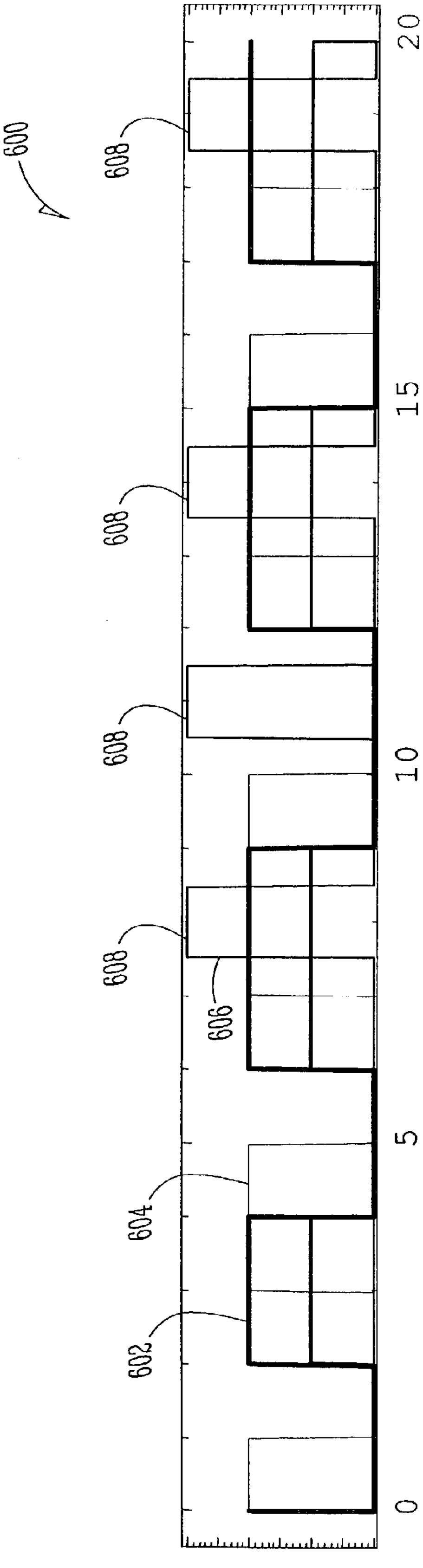
FIG. 6 is illustrates the thresholding of the sensor signals accordance with an embodiment of the present invention.

FIG. 6 illustrates the thresholding of the sensor signals accordance with an embodiment of the present invention. Quantized signals 600 include quantized signals 602, 604 and 606. Quantized signal 602 may correspond with a thresholding of signal 502 (FIG. 5), and quantized signal 604 may correspond with a thresholding of signal 504. Quantized signal 606, on the other hand, may correspond with an absolute-value thresholding of sum signal 506. Wide bits on an encoder track may be identified at points 608, which may correspond with +/− peaks 508 of sum signal 506 (FIG. 5). The absolute-value thresholding of sum signal 506 (e.g., quantized signal 606) may correspond with bits of sequence encoded on an encoder track, such as track 300 (FIG. 3). Accordingly, the motion of the track may be accurately measured by monitoring these quantized signals. The quantized signals may be used to generate quadrature pairs, which may be interpreted with a quadrature diagram and used to determine an incremental and/or absolute position of the encoder.

Figure 7:
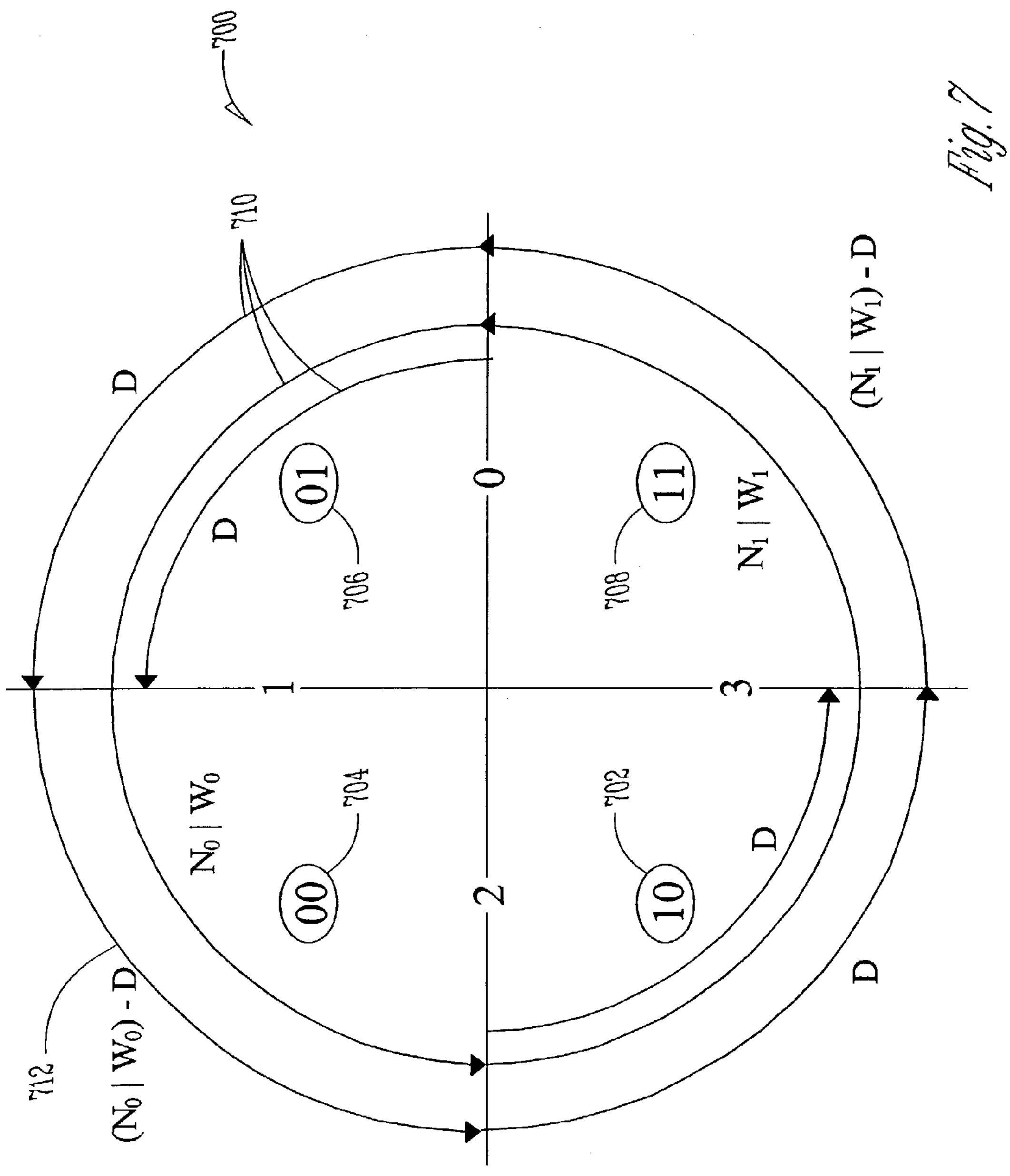
FIG. 7 is a quadrature diagram illustrating transitions of quadrature pairs accordance with an embodiment of the present invention.

FIG. 7 is a quadrature diagram illustrating transitions of quadrature pairs accordance with an embodiment of the present invention. Quadrature diagram 700 illustrates the transition of quadrature pairs, which may be generated from quantized signals 600 (FIG. 6) by a processing element, such as processing element 212 (FIG. 2). Quadrature pairs 702, 704, 706 and 708 are shown in the quadrature portions of diagram 700 and may be determined from the value of quantized signals 602 and 604 (FIG. 6). Arrows 710 indicate transitions of the quadrature pairs. The quadrature pairs may increment in a Gray code sequence in which only one bit changes at a time.

In embodiments, when one bit changes, the phase of the encoder may be known, and when both bits change, the phase change magnitude may be known. When either bit changes, the phase at that moment is known because it is known where on an encoder track the transition occurred. Arrows 710 illustrate encoder travel corresponding with each phase transition. For example, for transitions where the quadrature phase signal (e.g., signal 504) "catches-up" with the in-phase signal (e.g., signal 502), the distance the encoder track travels is illustrated as D, which in some embodiments may be the sensor spacing. For transitions when the in-phase signal leads the change, the width may depend on whether the current bit is a narrow or wide bit. For example, distance 712 is the distance the encoder travels and is illustrated as either N-D or W-D depending on whether the current bit is narrow or wide. In the illustrated example embodiment, N represents the width of a narrow bit, W represents the width of a wide bit, and D represents the sensor spacing.

The bit-width may be monitored by causing a one-value in the threshold sum signal (e.g., quantized sum signal 606) to latch anytime it is high within "00" or "11" quadrants. The signal may be sampled on any transition through the "00" or "11" quadrants, which indicates a transition from either "01" to "10" or from "10" to "01" (e.g., both bits change when in the "00" or "11" quadrants). The latch may be set or reset to zero on any transition into the "00" or "11" quadrants from either the "01" or "10" quadrants. The sequence of bits latched may correspond with a portion of the sequence and may be used to determine an incremental or absolute position of the encoder depending on the number of bits latched. Accordingly, incremental position encoding is at least achieved using the latch bit to adjust the measured motion.

Figure 8:
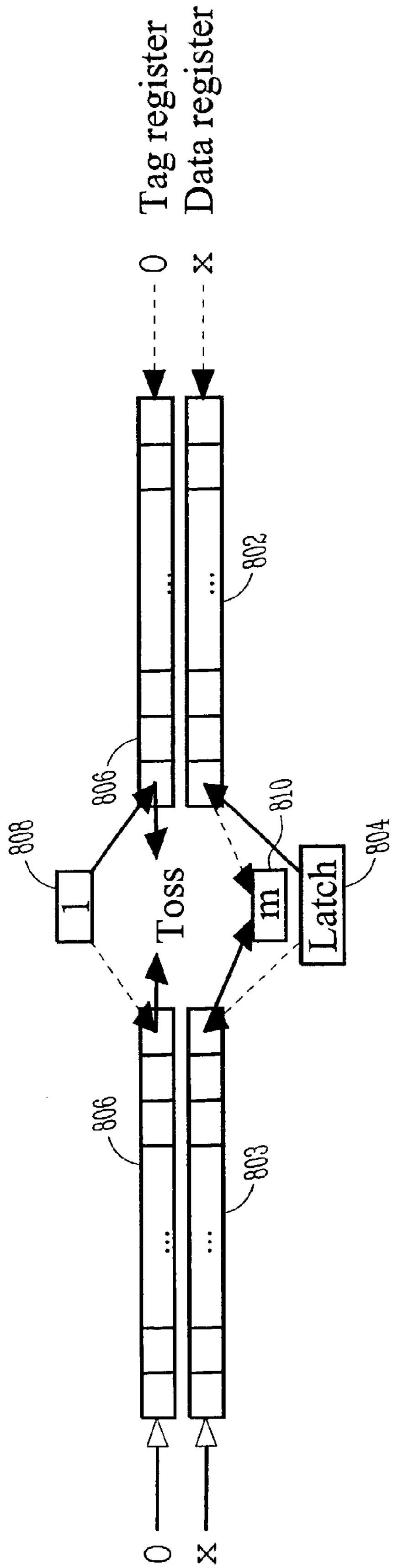
FIG. 8 illustrates tag and data shift registers accordance with an embodiment of the present invention.

FIG. 8 illustrates tag and data shift registers accordance with an embodiment of the present invention. In one embodiment, bits corresponding with a sampled thresholded signal (e.g., the sampled latch values), such as quantized signal 606 (FIG. 6), are shifted from latch 804 into shift data register 802 for positive rotational movement of the track, and shifted into shift data register 803 for negative rotational movement of the track. The value in latch 804 may be shifted into one of the shift registers when a transition through either the "00" or "11" quadrants occurs. In other words, a transition from "10"–"11"–"01", a transition from "01"–"11"–"10", a transition from "10"–"00"–"01", or a transition from "01"–"00"–"10" may shift the value of latch 804 into one of the shift registers. Transitions that do not transition through either the "00" or "11" quadrants do not shift the value in latch 804 into a shift register. The direction may be determined by the sign of the phase increment (e.g., MOD-4). In one embodiment, transitions of either "10"–"11"–"01" or "01"–"00"–"10" may indicate positive motion resulting in the value of latch 804 being shifted into data register 802. Transitions of either "10"–"00"–"01" or "01"–"11"–"10" may indicate negative motion resulting in the value of latch 804 being shifted into data register 803. In the embodiments described, a one may result in being shifted into one of the shift registers for wide bit width transitions, while and a zero may result in being shifted into one of the shift registers for narrow bit width transitions, however nothing requires this. In alternate embodiments, a zero may be shifted into one of the shift registers for wide bit width transitions, and a one may be shifted into one of the shift registers for narrow bit width transitions.

A bit, such as tag bit 808, may also be shifted into one of a set of tag registers 806 for each transition. The tag bit may indicate when corresponding sampled latch bits contain valid data. Tag bit of one may be shifted into one of the tag registers in either direction from center to indicate that the corresponding value in latch 804 has been loaded. Conversely, a tag bit of zero may be shifted in from the "feeding" end of the tag register to indicate that a corresponding tag bit is not available.

In embodiments using a PRN sequence, for a PRN sequence of length $2^N$ when the number of tag bits in either tag register 806 is N, an absolute position of the encoder may be determined. When the total number of tag bits in both of the tag registers combined is at least 2N-1, the absolute position of the encoder may be maintained, even when the direction of the track is reversed. When the number of tag bits in each of the tag registers is at least N, redundant absolute encoding is achieved allowing for error checking. When the number of bits in either tag register less than N, or the total number of bits in both tag registers is less than 2N-1, the position may be an incremental position of the track.

In an alternate embodiment of the present invention, three or more spatially separated sensors may be used to detect bit-width transitions of an encoder track. In this embodiment, the third sensor may be used to eliminate the generation of sum signal 506 (FIG. 5). In this embodiment, the bit-widths are selected and the three sensors are spaced so that they don't fit on a narrow bit of the encoder track, but fit on a wide bit when centered. In this embodiment, the sum signal may be determined by checking when the three pickoffs provide the same value at the same time.

In yet another alternate embodiment, the in-phase and quadrature phase pick-off signals may be treated like sine and cosine signals, respectively. In this embodiment, a two-parameter arctangent function may provide for a continuous phase angle within each four-transition cycle using the latched value 804 to provide any corrections.

In yet another embodiment, two displaced encoder tracks with separate pickoffs may be used. The separate pickoffs may be at the same angular position on the tracks.

In yet another embodiment, additional sets of sensors may be spaced around the encoder track and crosschecked. This may reduce sensitivity to particle contamination on the encoder track. In this embodiment, sensitivities to manufacturing tolerances (e.g., in sensor spacing) may also be reduced because a self-calibration process may be performed with the additional sets of sensors.

Figure 9:
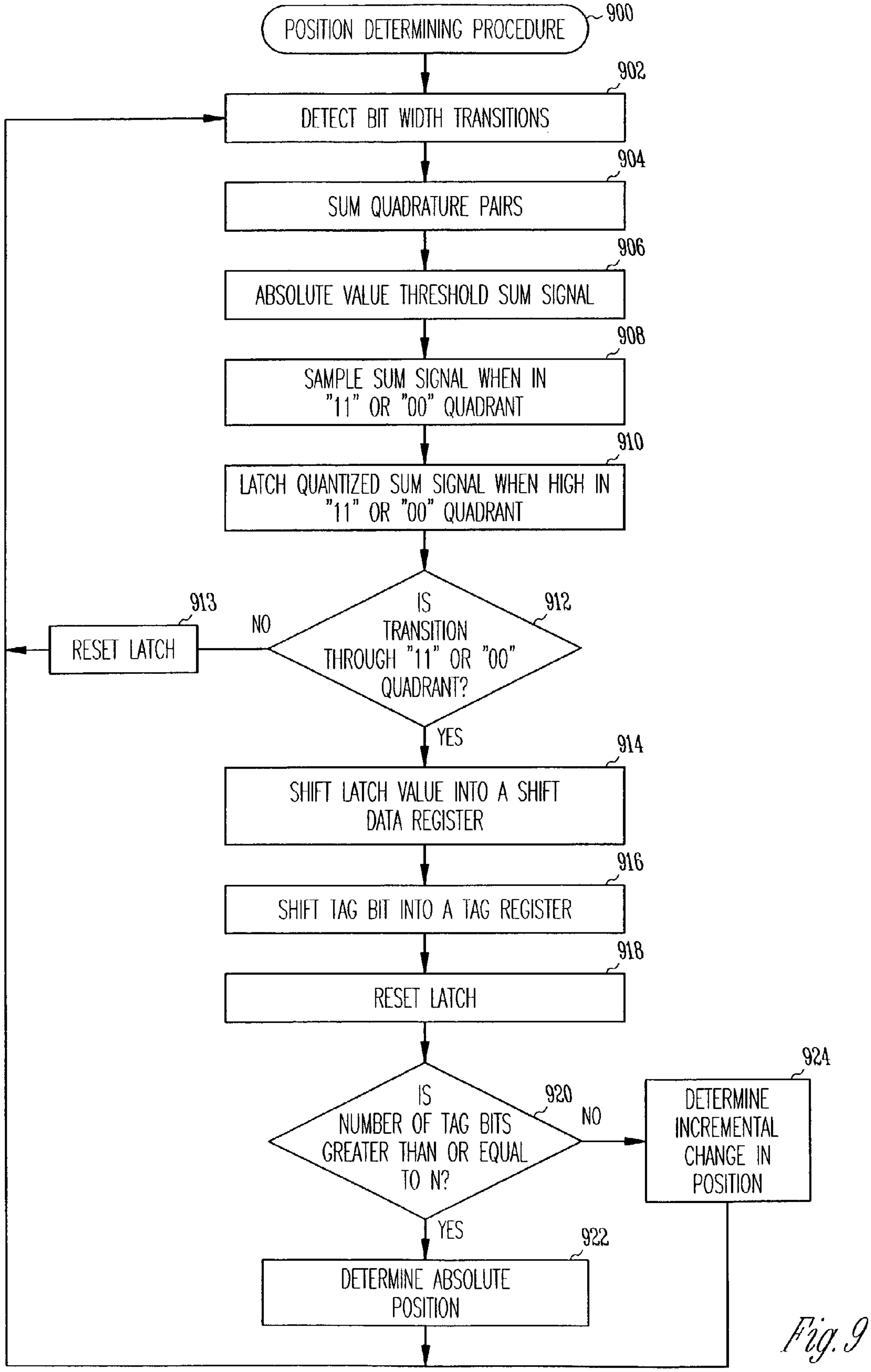
FIG. 9 is a flow chart of a position determining procedure in accordance with an embodiment of the present invention.

FIG. 9 is a flow chart of a position determining procedure in accordance with an embodiment of the present invention. Procedure 900 may be performed by a processing element, such as processing element 212 (FIG. 2) in combination with other elements, although other element configurations, including hardware, may also be suitable for performing procedure 900. Procedure 900 may be used to determine an incremental position and/or an absolute position an encoder track (e.g., track 202 FIG. 2) encoded with a pattern of bit-widths in accordance with a sequence. Although the individual operations of procedure 900 are illustrated and described as separate operations, one or more of the individual operations may be performed concurrently and nothing requires that the operations be performed in the order illustrated.

In operation 902, transitions between bit-widths on an encoder track are detected as the track moves. Sensors may be used to provide in-phase and quadrature-phase pick-off signals corresponding with bit width transitions. In operation 904, quadrature pairs may be generated from quantized pick-off signals. Operation 904 may include summing the in-phase and quadrature phase signals to generate a sum signal. In operation 906, an absolute value thresholding the sum signal is performed to generate a quantized sum signal, such as signal 606 (FIG. 6).

In operation 908, the quantized signal is sampled when the quadrature pair is in either the "11" or "00" quadrants.

If the quadrature pair is in either the "01" or "10" quadrants, the quantized sum signal is not sampled.

In operation 910, the quantized sum signal may be latched when the signal goes high when the quadrature pair is in either the "11" or "00" quadrants. If the quantized sum signal goes high when the quadrature pair is in either the "01" or "10" quadrants, the quantized sum signal is not latched.

Operation 912 determines when a transition through either the "11" or "00" quadrant has occurred. In other words, operation 912 determines if a transition from "10"–"11"–"01", a transition from "01"–"11"–"10", a transition from "10"–"00"–"01", or a transition from "0"–"00"–"10" occurred. If operation 912 determines that the transition is not through either the "11" or "00" quadrants, the latch may be reset in operation 913 and operations 902 through 912 may be repeated for subsequent transitions. If operation 912 determines that the transition is through either the "11" or "00" quadrants, operation 914 is performed.

In operation 914, the latch value, latched in operation 910, is shifted into one of the shift data registers. In one embodiment, the latch value is shifted into one shift data register when the direction of motion is in one direction, and shifted into another shift data register when the direction of motion is in the other direction. In embodiments, because the latch value is set when the absolute value threshold sum signal is high in the "00" or "11" quadrants, the latch value shifted into the shift data registers may be one for the wide bit-widths and may be a zero for the narrow bit-widths encoded on the encoder track.

In operation 916, a tag bit is shifted into one of the tag registers. In one embodiment, the tag bit is shifted into one tag bit register when the direction of motion is in one direction, and shifted into another tag bit register when the direction of motion is in the other direction.

In operation 918, the latch is reset. Operation 920 determines when the number of bits in one of the tag bit registers is greater than a predetermined number. In the case of a $2^N$ PRN sequence, the predetermined number may be N. When the number of tag bits is greater than or equal to the predetermined number, absolute encoding may be determined in operation 922. When the number of tag bits is less than the predetermined number, incremental encoding may be performed in operation 924.

In one embodiment, when rather than performing incremental encoding in operation 924, operations 902–920 may be repeated until enough information is available to perform absolute encoding. Alternatively, an output flag may indicate when the output is incremental (e.g., no absolute zero reference).

In operations 922 and 924, latch bits, which should be at least N bits for absolute encoding, are collected from one of the shift data registers. When the motion of the track is in one direction, the latch bits may be collected from one shift data register, and when the motion of the track is in the other direction, the latch bits may be collected from the other shift data register.

In one embodiment, the collected latch bits may be indexed into a table, such as LUT 216 (FIG. 2) to determine the position of the encoder track. A match to a unique subsequence in the table may be identified. The position will be absolute or incremental depending on the number of bits available. Different tables may be used for different directions of the track.

In an alternate embodiment, a code generator, such as code generator 220 (FIG. 2) may be used to generate a sequence identical to the sequence encoded on the encoder track. In this embodiment, the sequence may be generated until a match is identified. The location on the track may be determined from where in the sequence the match is identified. The sequence may be generated in one direction when the motion of the track is in one direction, and the sequence may be generated in the reverse direction when the motion of the track is in the reverse direction. Alternatively, the approaches may be combined using imprecise lookups based on a partial subsequence.

Upon the completion of operation 922, absolute positional encoding has been achieved. In one embodiment, incremental positional updates may now be determined because less than N bits are required for incremental position determination once an absolute position is determined.

In one embodiment, when the tag register indicates that there are at least 2N total bits in total from both sides of the shift data register, or N bits in both shift data registers, redundant absolute position encoding may be achieved. In this embodiment, identical absolute positions may be determined from both sets of bits. This embodiment may be used to check for errors, among other things.

At least some operations of procedure 900 may be performed on a continual basis to provide incremental and/or absolute position information of the encoder track of a positional encoder. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof.

The encoding performed by embodiments of the present invention may provide several layers of redundancy which may be used for error checking, and in some cases, may decrease the implementation complexity. In one embodiment, when tag bit 808 (FIG. 8) tossed from the middle is a one, the bit shifted into "m" 810 should match the latched value in latch 804 shifted in. Similarly, after absolute encoding is achieved (e.g., in operation 922), the next latched value may be known a-prior from the phase direction and the sequence. This may be used to cross check the sensed latch value.

In another embodiment, an incremental position may be determined after an initial absolute position determination allowing processor-based absolute decoding at system initialization, followed by hardware implemented decoding therefore.

Thus, an improved position encoder and method for determining position of an encoder track have been described. A position encoder and method where the unambiguous range may be increased almost without limit have also been described. A position encoder and method where the unambiguous range may be increased without degrading absolute accuracy have also been described. A position encoder and method with an increased unambiguous range without a significant increase in size or complexity, if any have also been described. An optical position encoder and method that may be less sensitive to contamination have also been described. A gimbaled system with improved line-ofsight tracking has also been described. The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A position encoder comprising:

a track encoded with a pattern comprising a plurality of unique subsequences, the pattern having alternating dark and light portions wherein both the dark and light portions have widths that vary in accordance with bits of the subsequences;

two or more sensors to detect edges and the widths of the alternating dark and light portions as the track moves; and a processing element to generate a portion of at least one of the unique subsequences from signals provided by the sensors for use in initially determining an incremental position of the track, wherein the sensors comprise first and second sensors spaced apart approximately one-half their field of view to provide partially overlapping fields of view, wherein the first sensor is to provide a quadrature-phase pick-off signal, the second sensor to provide an in-phase pick-off signal, and wherein the processing element is to generate quadrature pairs from the quadrature-phase and in-phase pick-off signals, is to generate bits of the sequence based on the quadrature pairs, and is to determine an absolute position of the track when a number of bits generated exceed a predetermined number.

2. The encoder of claim 1 wherein the processing element is to determine an absolute position of the track based on updates to the incremental position, and wherein the processing element is to determine the widths of the alternating dark and light portions based on one of either a sum signal from two or more of the sensors or a logical combination of signals from three or more sensors.

3. The encoder of claim 1 wherein the track is a single track and wherein the widths of both the alternating dark and light portions are either a first width or a second width determined by the pattern, the first width representing "ones" in the sequences, the second width representing "zeroes" in the sequences.

4. A position encoder comprising:

a track encoded with a pattern comprising a plurality of unique subsequences;

sensors to detect the pattern as the track moves; and a processing element to detect a portion of at least one of the unique subsequences from the signals provided by the sensors for use in determining either an absolute or incremental position of the track, wherein the sensors comprise first and second sensors, the first sensor to provide a quadrature-phase pick-off signal, the second sensor to provide an in-phase pick-off signal, wherein the processing element:

to generate quadrature pairs from the quadrature-phase and in-phase pick-off signals, to sum the quadrature-phase and in-phase pick-off signals and absolute value threshold the sum to generate a quantized signal, to sample the quantized signal when the quadrature pairs indicate "00", or "11", quadrants, to latch a bit when the sampled quantized signal is high when the quadrature pairs indicate "00" or "11" quadrants, to shift the latched bit into a data-shift register when a transition through either the "00" or "11" quadrant occurs, and to determine a position of the track from bits shifted into the data-shift register, the bits shifted into the data-shift register corresponding with a portion of at least one of the unique subsequences.

5. The encoder of claim 4 wherein the pattern is a pseudo-random noise (PRN) sequence having a length of 2N bits, and wherein the position is an absolute position of the track when a number of latched bits is at least N, and the position is an incremental position of the track when the number of latched bits is less than N.

6. The encoder of claim 5 further comprising a memory to store a table with the plurality of unique subsequences, the processing element to compare the bits in the data-shift register with the unique subsequences in the table to determine the position of the track at a last-detected transition.

7. The encoder of claim 5 further comprising a code generator to generate a sequence comprising the unique subsequences, the processing element to compare subsequences of the generated sequence with the bits in the data-shift register to determine the position of the track at a last-detected transition.

8. The encoder of claim 5 wherein the processing element shifts the latched bit into a first one of the data shift registers for positive rotational movement of the track, and shifts the latched bit into a second one of the data shift registers for negative rotational movement of the track, and wherein the encoder further comprising a set of tag registers initialized with zeros, wherein the processing element shifts a tag bit into one of the tag registers for latched bits shifted into the shift data registers, the processing element using the tag bits to determine whether the position is an incremental position or an absolute position.

9. A method of determining a position of a track encoded with a pattern comprising a plurality of unique subsequences, the pattern having alternating dark and light portions wherein both the dark and light portions have widths that vary in accordance with bits of the subsequence, the method comprising:

detecting edges and widths of the alternating dark and light portions as the track moves with two or more sensors;

generating a least a portion of the unique subsequences in a bit-by-bit manner from outputs of the sensors; and comparing the generated portion with the pattern to initially determine an incremental position of the track, wherein sensors comprise first and second optical sensors positioned to have partially overlapping fields of view, the method further comprising:

providing by the first sensor a quadrature-phase pick-off signal;

providing by the second sensor an in-phase pick-off signal;

generating quadrature pairs from the pick-off signals for use in generating bits of the sequence; and determining an absolute position of the track when a number of bits generated exceed a predetermined number.

10. The method of claim 9 method further comprising:

determining an absolute position of the track based on updates to the incremental position; and determining the widths of the alternating dark and light portions based on one of either a sum signal from two or more of the sensors or a logical combination of signals from three or more sensors.

11. The method of claim 9 wherein the track is a single track and wherein the widths of both the alternating dark and light portions are either a first width or a second width determined by the pattern, the first width representing "ones" in the sequences, the second width representing "zeroes" in the sequences.

12. A method of determining a position of a track encoded with a pattern comprising a plurality of unique subsequences, the method comprising:

detecting transitions as the track moves with sensors;

combining outputs of the sensors to generate a least a portion of the unique subsequences;

comparing the generated portion with the pattern to determine either an absolute or incremental position of the track;

providing a quadrature-phase pick-off signal with a first sensor and an in-phase pick-off signal with a second sensor;

generating quadrature pairs from the quadrature-phase and in-phase pick-off signals;

summing the quadrature-phase and in-phase pick-off signals and absolute value thresholding the sum to generate a quantized signal;

sampling the quantized signal when the quadrature pairs indicate "00" or "11" quadrants;

latching a bit when the sampled quantized signal is high when the quadrature pairs indicate "00" or "11" quadrants;

shifting the latched bit into a data-shift register when a transition through either the "00" or "11" quadrant occurs; and determining a position of the track from bits shifted into the data-shift register, the bits shifted into the data-shift register corresponding with a portion of at least one of the unique subsequences.

13. The method of claim 12 wherein the pattern is a pseudo-random noise (PRN) sequence having a length of 2N bits, and wherein the position is an absolute position of the track when a number of latched bits is at least N, and the position is an incremental position of the track when the number of latched bits is less than N.

14. The method of claim 12 further comprising comparing the bits in the data-shift register with unique subsequences in a table to determine the position of the track at a last-detected transition.

15. The method of claim 12 further comprising:

generating a sequence corresponding with the unique subsequences of the pattern; and comparing unique subsequences of the generated sequence with the bits in the data-shift register to determine the position of the track at a last-detected transition.

16. The method of claim 12 further comprising:

shifting the latched bit into a first one of the data shift registers for positive rotational movement of the track;

shifting the latched bit into a second one of the data shift registers for negative rotational movement of the track;

shifting a tag bit into a tag register each for each latch bit shifted into the shift data registers; and using the tag bits to determine whether the position is an incremental position or an absolute position.

17. A system comprising:

first and second nested gimbals;

a first position encoder to determine an angular position of the first gimbal with respect to a base; and a second position encoder to determine an angular position of the second gimbal with respect to the first gimbal, wherein the position encoders have tracks encoded with a pattern of alternating dark and light portions wherein both the light and dark portions of each track have widths that vary in accordance with a sequence comprising a plurality of subsequences, the position encoders further having two or more sensors to detect edges and the widths of the alternating dark and light portions as the tracks move, and wherein a processing element is to determine an incremental positions of the tracks from sensor signals wherein each sensor comprises first and second optical sensors positioned to have partially overlapping fields of view, wherein the first and second sensors of each encoder are spaced apart to provide the partially overlapping fields of view, and wherein the first sensor is to provide a quadrature-phase pick-off signal, the second sensor to provide an in-phase pick-off signal, and wherein the processing element is to generate quadrature pairs from the quadrature-phase and in-phase pick-off signals, is to generate bits of the sequence based on the quadrature pairs, and is to determine an absolute position of the track when a number of bits generated exceed a predetermined number.

18. The system of claim 17 wherein the processing element is to determine an absolute position of the track based on updates to the incremental position, and wherein the processing element is to determine the widths of the alternating dark and light portions based on one of either a sum signal from two or more of the sensors or a logical combination of signals from three or more sensors.

19. The system of claim 17 wherein the track is a single track and wherein both the alternating dark and light portions are either a first width or a second width determined by the pattern, the first width representing "ones" in the sequences, the second width representing "zeroes" in the sequences.

20. A system comprising:

first and second nested gimbals;

a first position encoder to determine an angular position of the first gimbal with respect to a base; and a second position encoder to determine an angular position of the second gimbal with respect to the first gimbal, wherein the position encoders have tracks encoded with a pattern of bit-widths in accordance with sequence comprising a plurality of subsequences, have sensors to detect the pattern as the tracks move, and have a processing element to determine the positions of the tracks from sensor signals;

wherein each of the sensors comprise first and second sensors, the first sensor to provide a quadrature-phase pick-off signal, the second sensor to provide an in-phase pick-off signal, wherein the processing element of each encoder:

to generate quadrature pairs from the quadrature-phase and in-phase pick-off signals, to sum the quadrature-phase and in-phase pick-off signals and absolute value threshold the sum to generate a quantized signal, to sample the quantized signal when the quadrature pairs indicate "00" or "11" quadrants, to latch a bit when the sampled quantized signal is high when the quadrature pairs indicate "00" or "11" quadrants, to shift the latched bit into a data-shift register when a transition through either the "00" or "11" quadrant occurs, and to determine a position of the track from bits shifted into the data-shift register, the bits shifted into the data-shift register corresponding with a portion of at least one of the unique subsequences.

* * * * *